United States Patent [19]
Reid et al.

[11] Patent Number: 4,586,339
[45] Date of Patent: May 6, 1986

[54] THERMAL ENERGY CONVERSION

[76] Inventors: Allen F. Reid, 4736 Reservoir Rd., Geneseo, N.Y. 14454; Albert H. Halff, 3514 Rock Creek Dr., Dallas, Tex. 75204

[21] Appl. No.: 512,668

[22] Filed: Jul. 11, 1983

Related U.S. Application Data

[63] Continuation-in-part of Ser. No. 350,141, Feb. 19, 1982, abandoned.

[51] Int. Cl.$^4$ ............................................... F03G 7/04
[52] U.S. Cl. ..................................... 60/641.7; 60/676
[58] Field of Search .................... 60/641.6, 641.7, 655, 60/670, 676, 641.8, 641.9; 126/415

[56] References Cited

U.S. PATENT DOCUMENTS 4,031,706  6/1977  Vakil et al. ...................... 60/670 X
4,170,878 10/1979  Jahnig ................................. 60/641.7

FOREIGN PATENT DOCUMENTS 148688 11/1981 Japan .................................. 60/641.7

*Primary Examiner*—Stephen F. Husar
*Attorney, Agent, or Firm*—Stoll, Wilkie, Previto & Hoffman

[57] ABSTRACT

In heat transfer from a warm water source, efficiency is improved in a thermal energy conversion (TEC) by increasing the temperature of heat supplied to a turbine system substantially above the water temperature. This temperature increase is accomplished in a separate system by reacting gaseous ammonia with water to produce sensible heat at a high temperature; the ammonia is later fractionated from the water using lower temperature heat from the existing heat source. A single-stage temperature increase system (TIS), may be used or there may be an addition of a second stage for raising the temperature of the heat supply even higher.

22 Claims, 2 Drawing Figures

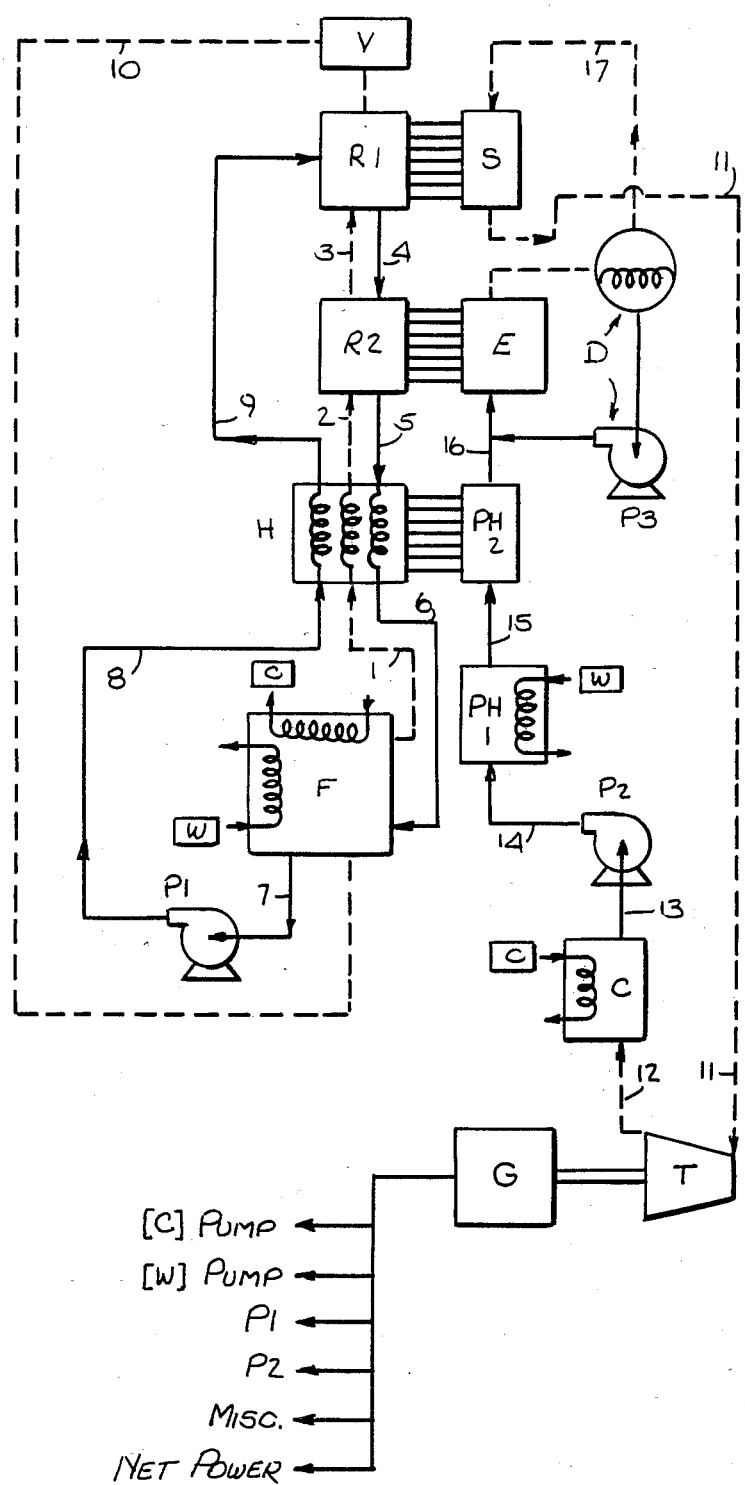

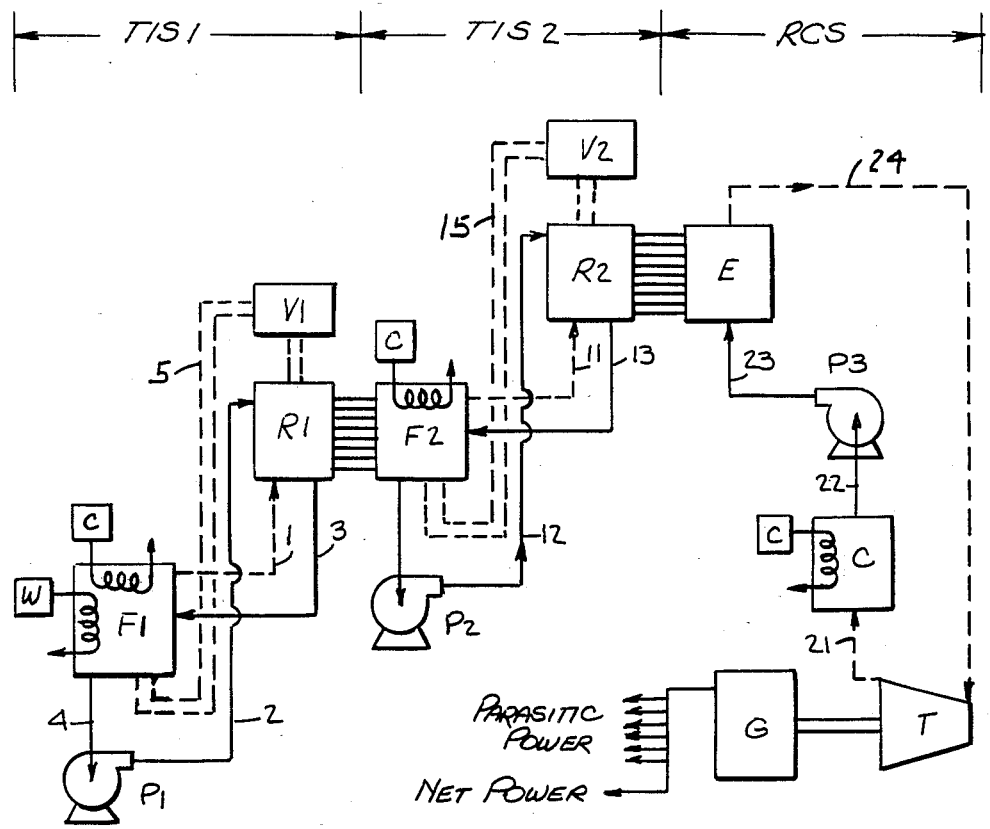

THERMAL ENERGY CONVERSION

BACKGROUND OF THE INVENTION

This application is a continuation-in-part of Ser. No. 350,141 filed 2/19/82, now abandoned.

Numerous low-temperature gradient heat sources have not been harvested for power production because the conversion efficiency is prohibitively low. Recently, with power costs soaring, the feasibility of power from these sources is being reexamined, with special attention directed to conversion of energy from naturally heated water.

Such ideas are not new since as early as 1881 d'Arsonral proposed an Ocean Thermal energy conversion (OTEC); and in 1930 Georges Claude demonstrated the idea in ocean waters using deep sea water for his cold source and surface water for his heat source in an open Rankine cycle process. Since then many others have made studies of OTEC designs, generally concluding that closed Rankine cycle plants would be more feasible with existing technology. In theses studies, ammonia was generally one of the favored choices for a working fluid, if not the top choice. Dugger, G. L., E. J. Frances and W. H. Avery; 1976. Technical and Economic Feasibility of Ocean Thermal Energy Conversion, Sharing the Sun: Solar Technology in the Seventies, Vol. 5 Solar Thermal and Ocean Thermal. Library of Congress, April 1978, Energy from the Ocean, U.S. Govt. Printing Office.

The attractiveness of ponds, lakes, sea or ocean waters as heat sources for the energy conversion resides in several factors:

1. Zero fuel costs.
2. The thermal gradients are a product of solar or earth heat energy, continuously renewable.
3. A TEC operation using solar heated bodies of water, unique among all solar technologies, will not be interrupted when the sun does not shine.
4. The amount of energy is vast.
5. In warmer areas, the temperatures remain fairly constant, with only minor seasonal and diurnal variations; consequently, large storage capacity is unnecessary.
6. Production of wastes by TEC power plants is negligible compared to nuclear and fossil fuel plants. The problem of disposal of large amounts of heated water is greatly reduced.
7. A TEC facility could produce energy-intensive materials (such as aluminum and fertilizers), reducing demands on other fuel supplies.
8. In addition to producing electric power, a TEC facility could produce portable fuels, such as hydrogen and ammonia.

Most of the problems anticipated in such practical conversions are economic. All the technology necessary is understood, and the details for implementation have been extensively studied and continue to be investigated. Plant prototypes have been engineered; and a pilot OTEC installation was successfully operated to collect data in late 1979. Biofouling and corrosion of heat exchangers are major concerns, but not prohibitive; options for satisfactory handling are available and choices are primarily cost-related. Three serious limitations persist:

1. In an OTEC, the difference in temperature between the sun heated surface layer of oceans and the cold, deep layers is seldom substantially greater than 20° C., supporting only 3.3% thermal efficiency in conventional Rankine cycle systems. No other type plant promises as high feasibility. The consequences are formidable capital costs, with heat exchanger costs of one-third to one-half of the total.
2. Ocean waters with reliable temperature differences are not close enough to most major electric power demands for economic electricity transmission to them. Except for electric power transmissions to tropical coastal areas, OTEC power would need to be used at or near the production site e.g. in energy intensive manufacture or in production of chemicals to be shipped or piped to utilization sites for energy release or conversion.
3. The density of OTEC siting is limited. Even though the ocean resource is enormous, the environmental impact of large scale OTEC operation may be significant. It has been calculated that this should not be a formidable deterrent at this time and that the Gulf stream should be able to support OTEC output of nearly 200,000 MWe without deleterious effects on the environment of any magnitude, an output roughly equivalent to the total US electric utility sales to customers. These calculations were based on conservative estimates from available relevant data, including the critical assumption that a temperature reduction of 0.5° C. in the upper 10 meters of the Gulf Stream would be tolerated.

It is evident that a major determinant of the future of OTEC, if not the most important factor, is the low efficiency of thermal conversion due to the small temperature differences between warm and cold water layers. No method of countering this problem has yet been tested. It is well known that part of the heat from low temperature sources may be made available at higher temperatures if enough of the remaining heat is rejected at lower temperatures, avoiding challenge to the second law of thermodynamics. A number of devices have been known for some time which can accomplish this, including the Hilsch tube and vapor compression heat pumps, but their use is unsuitable for power production, since more power is needed to operate them than can be gained by the higher temperatures.

Somewhat similar to OTEC are other thermal conversion operations which harvest solar energy caught in smaller bodies of water and which use the same general methods for conversion of heat to mechanical or electrical energy: utilizing the heat from the warm water to vaporize a working fluid to a gas which drives a turbine in a typical Rankine cycle. Seas, lakes and ponds are all possibilities for such bodies of water; all could furnish substantial amounts of warm water from surface layers. As with ocean waters, the temperatures of the warm water would be low so TEC efficiency would be low; however, as well as enjoying the good OTEC features of non-pollution, no fuel requirement, and operation when the sun is not shining, these TECs would have some added advantages:

(1) They could be sited in areas that have no convenient access to OTEC;
(2) Smaller installations would be feasible when desired; and
(3) They could provide warmer water than ocean waters.

Currently, areas of the Dead Sea and many smaller pond areas are being used for TEC. In order to increase the temperature of the warm water and to increase and conserve the heat absorbed from solar radiation, certain devices are used. When a pond is constructed for TEC, a typical installation will have a salt solution 3 to 5 meters deep, residing over an impervious lining to prevent seepage loss. Solar energy penetrates to varying depths and warms the solution. In order to prevent the warmed solution from rising to the surface where it would lost energy to the atmosphere by evaporation, convection and radiation, the salt solution is maintained in layers of concentration increasing with depth, making a "salt gradient solar pond" (SGSP). Since the more concentrated solutions have greater density, even when heated, they maintain their levels and do not approach the surface. Such ponds commonly have 3 functional zones:

(1) A thin surface layer of fresh water to flush away dust and debris deposited from the atmosphere;
(2) Below that, a non-convective zone, which absorbs most of the solar energy; and
(3) Below that, a storage zone of heated salt solution.

The heat is harvested in one of two ways: either by withdrawing solution from the storage zone, collecting heat from it through heat exchange, and returning the solution to the pond, or by installing heat exchangers in the storage zone.

Various methods are used to reduce heat loss from the top layers. These include criss-crossing long strips of screen over the pond surface to counteract wave motion which would stir up lower layers or layering a transparent gel above the collecting zone.

In operation, the temperature of the heated solution depends on rates of heat withdrawal and the solar energy available; in the contiguous United State 80° to 80° C. could be good working temperatures. Although substantially higher than ocean warm water temperatures, generally they would not support Rankine cycle efficiencies of over 12%.

This application describes a feasible process to increase thermal conversion efficiency of available heat in warm water by increasing the temperature of the heat input to a closed Rankine cycle system without excessive, parasitic power requirements, implementing one variation of the general process.

Accordingly, an object of the present invention is to provide a practical efficient warm water thermal energy conversion means and method.

BRIEF DESCRIPTION OF THE DRAWING

A preferred embodiment of the invention has been chosen for purposes of illustration and description and is shown in the accompanying drawings, forming a part of the specification wherein:

FIG. 1 is a schematic diagram of a system in accordance with the invention of a one-stage TIS.

FIG. 2 is a schematic diagram of a system in accordance with the invention using a two-stage TIS.

DESCRIPTION OF THE PREFERRED EMBODIMENT

A temperature increase system (TIS) uses heat from warm water to decompose and separate ammonium hydroxide ($NH_4OH$) into ammonia ($NH_3$) and water ($H_2O$), then transfers these reactive substances to a heat exchanger in which they recombine releasing heat at a higher temperature. On the other side of the heat exchange surface, a working fluid is heated, vaporized and superheated by this heat; and the vapor drives a turbine in a typical closed Rankine cycle system (RCS) and is condensed with cold water.

An OTEC plant incorporating a single-stage TIS is diagrammed in FIG. 1, the TIS system on the left using flow lines 1 through 10, and the RCS system on the right using lines 11 through 17. In operation of the TIS, ammonia gas from fractionator F passes via line 1 into heat exchanger H collecting heat; thence via line 2 into reactor R2 where it meets a weak ammonia (mostly as ammonium hydroxide) solution from R1 via line 4. Most of the ammonia gas reacts with water in the solution to form more ammonium hydroxide with liberation of substantial amounts of heat at a higher temperature; the remaining ammonia gas proceeds via line 3 to R1 where it reacts completely with water from F (via line 7, pump P1, line 8, heat exchanger H, and line 9), liberating heat at a high temperature.

As the water proceeds from line 9 through R1 it progressively increases in ammonia content; through R2 it increases in ammonia content even more. Moving through H, it rejects heat to warm water and ammonia gas from F and liquid ammonia in the RCS. The partly cooled ammonia solution proceeds via line 6 to F, where the ammonia is fractionally distilled out with heat from warm sea water and reflux condensation from cold sea water; the resulting gaseous ammonia and liquid water are then recycled through the reactors as before. Hydrogen gas, with a reservoir in vessel V, is maintained in the system to equalize gas pressure throughout, thereby minimizing power expenditures for pumping.

The RCS (Rankine cycle system) is conventional, with most of the heat delivered from the TIS through heat exchange surfaces directly to the working fluid (WF). To reduce the amount of heat used from the TIS, the working fluid is first heated to as high a temperature as practical in preheater PH1 with heat from warm sea water. WF proceeds via line 15 to preheater PH2 where it is further heated by heat rejected from hot ammonia solution in H. WF then proceeds to evaporator E, where it is vaporized, to the demister D, and to superheater S, collecting heat in E and S from the ammonia-water reaction in R2 and R1. The superheated gas proceeds through line 11 to drive turbine T via line 12 to condenser C, cooled by cold sea water. The liquified WF is then pumped back into the cycle by feed pump P2 through line 14.

Only a single-stage TIS is shown, but multiple-stage units may be utilized: a low stage produces heat at a higher temperature, and this heat is the driving heat for the fractionator of the next stage. The number of stages to be used depends on economic tradeoffs rather than on physical and chemical constraints of the water-ammonia system, since other chemical reactions may be employed at temperatures above practical ranges for the water-ammonia system.

FIG. 2 diagrams a TIS-RCS system employing two sequential temperature increase stages. The first stage, incorporating sections P1, F1, R1 and V1, uses heat from warm sea water to separate ammonia gas from an ammonium hydroxide solution in fractionator F1; this gas then flows via line 1 to reactor R1. The solution in F1, depleted of ammonia, is routed via line 4, pump P1 and line 2 to R1, where it reacts with the ammonia from line 1 to produce the former ammonium hydroxide solution, releasing the heat of reaction previously acquired in F1 from the warm sea water. The ammonium hydroxide solution returns via line 3 to F1 to complete the cycle which may be repeated again and again. The heat released at a temperature substantially above the temperature of the warm sea water, is transferred through heat conductive means to fractionator F2 in the second TIS stage. A gas not chemically active in the system, e.g. hydrogen, is maintained in vessel V1 and traverses line 5 between F1 and R1 to equalize pressures in the system, thereby reducing pumping energy requirements.

In F2 the heat from R1 separates ammonia gas from a solution of ammonium hydroxide; the ammonia flows via line 11 to R2. Solution depleted of ammonia flows from F2 via line 14, pump P2 and line 12 to R2 where it reacts with ammonia to produce ammonium hydroxide solution enriched in ammonia, releasing heat at a temperature substantially higher than that in F2. The ammonium hydroxide solution cycles back to F2; and the heat evaporates a working fluid, e.g. ammonia, in evaporator E in a closed Rankine cycle. The ammonia gas flows via line 24 to turbine T in which it expands and cools and drives the turbine, exiting through line 21 to condenser C. After condensation to liquid phase in C, the ammonia is cycled via line 22, pump P3 and line 23 back to E.

The mechanical energy from T may be used directly or to manufacture electricity as diagrammed. Using the same amount of heat and under conditions in which the cooling temperature in the condenser remains the same, the amount of mechanical energy available from a Rankine cycle turbine is increased when the temperature in the evaporator is increased. Theoretically, the maximum thermal efficiency, the efficiency of conversion of heat into mechanical energy, in the Rankine cycle is:

$$\frac{T\text{(evaporator)} - T\text{(condenser)}}{T\text{(evaporator)}}$$

where the T values are in absolute temperature units; thus a substantial increase in thermal efficiency may be realized with higher evaporator temperatures.

In FIG. 2 only major functional units and relationships are diagrammed and heat exchanges between process lines are not shown. The TIS diagrammed in FIG. 1, showing more detail, is essentially the same conceptual design as each stage in FIG. 2; the extra detail is merely illustrative since several methods may be used in implementing the process.

Estimated flow specifications for a 100 MWe OTEC plant and using the one-stage TIS system diagrammed in FIG. 1 are listed in Table 1. Specifications for a 100 MWe OTEC plant using the two-stage TIS system diagrammed in FIG. 2 are listed in Table 2.

Values of performance characteristics of both one and two-stage TIS-assisted plants are compared in Table 3 with a conventional Rankine cycle plant using ammonia as a working fluid. Thermal efficiency of the one-stage TIS plant is three times that of the conventional plant; thermal efficiency of the two-stage TIS plant is well over four times that of the conventional plant.

Selection of the number of stages to be used would depend greatly on capital costs, of course, but would also depend on the size of the warm and cold water resource, since the TIS assisted plants could produce more power from the same amount of resource heat and cooling. This would be particularly important where lake water is to be used or where thermal disturbance of ocean areas must be limited for environmental reasons.

The greatly increased thermal efficiency of the TIS plant is reflected in several highly significant savings in capital costs, as warm sea water and cold sea water flow rates are reduced by 69% and 72% respectively. This results in a comparable decrease in heat exchanger, pump, and piping costs, and with substantial savings in other capital construction. The Applied Physics Laboratory, Johns Hopkins University, estimated baseline OTEC-RCS capital costs for 1st through 6th OTEC plant ships without temperature enhancement each rated 500 MWe net. (Avery, W. H., R. W. Blevins, G. L. Dugger and E. J. Francis, 1976. Maritime and construction aspects of ocean thermal energy conversion (OTEC) plant-ships, APL/JHU Report SR 76-1A and 1-B.) OTEC estimates are summarized in Table 3 for $/kw construction of the 6th plant. A parallel estimate of TIS-RCS costs is tabulated using the assumption that $/kw are independent of size of plant, a reasonable assumption based on the premise that a more efficient plant could be made physically as large, if necessary to optimize costs, and would produce more power. For the TIS estimate, an assumption is made that unit costs for thermal equivalent transfer surfaces are the same as for the RCS; other structural component costs are estimated with less precision. When totaled, the TIS-RCS capital cost estimate is only 40% of the estimate for the power equivalent conventional RCS plant.

TABLE 1

100 MWe TIS-RCS TEC PLANT PERFORMANCE CHARACTERISTICS

| Line | t °F. | p psia | wt % NH$_3$ | h btu/lB | w K lb/sec | w-h K btu/sec |
|---|---|---|---|---|---|---|
| 1 | 70.0 | 128.8 | 99.99 | 629.1 | 1.536 | 966 |
| 2 | 96.6 | *127.8 | 99.99 | 647.9 | 1.536 | 995 |
| 3 | 134.0 | *126.8 | 98.63 | 678.6 | .420 | 288 |
| 4 | 203.0 | 131.8 | 19.47 | 135.0 | 2.220 | 300 |
| 5 | 134.3 | 130.8 | 46.00 | 40.8 | 3.338 | 136 |
| 6 | 85.0 | 129.8 | 46.00 | −15.2 | 3.338 | −51 |
| 7 | 70.0 | 128.8 | 0.01 | 38.1 | 1.803 | 69 |
| 8 | 70.1 | 133.8 | 0.01 | 38.1 | 1.803 | 69 |
| 9 | 96.6 | 132.8 | 0.01 | 64.6 | 1.803 | 116 |
| 10 |  | 128.8 | Hydrogen |  |  |  |
| 11 | 188.00 | 280.0 | 100 | 687.5 | 1.914 | 1316 |
| 12 | 50.85 | 90.19 | 100 | 625.6 | 1.914 | 1197 |
| 13 | 50.00 | 89.19 | 100 | 97.9 | 1.914 | 187 |
| 14 | 51.70 | 285.0 | 100 | 99.9 | 1.914 | 191 |
| 15 | 70.00 | 284.0 | 100 | 120.5 | 1.914 | 231 |
| 16 | 118.93 | 282.5 | 100 | 177.9 | 1.914 | 340 |
| 17 | 118.93 | 281.0 | 100 | 634.0 | 1.914 | 1213 |
| (c) in 43.13 |  |  | 0 | 11.18 | 381.9 | 4270 |
| (C) out 45.82 |  |  | 0 | 13.88 | 381.9 | 5301 |
| (W) in 78.26 |  |  | 0 | 46.32 | 545.5 | 25266 |
| (W) out 76.15 |  |  | 0 | 44.21 | 545.5 | 24115 |
| Gross Power: |  |  | 108.61 | MWe |  |  |
| Pump (C) |  | = | 2.26 |  |  |  |
| Pump (W) |  | = | 1.92 |  |  |  |
| P1 |  | = | 0.09 |  |  |  |
| P2 |  | = | 3.75 |  |  |  |
| Miscellaneous power |  | = | 0.59 |  |  |  |
| Net Power: |  |  | 100.00 | MWe |  |  |

*partial pressure of H$_2$ is not included.

Anhydrous ammonia properties are from ASHRAE tables (ASHRAE Thermodynamic Properties of Refrigerants, 1969, Am. Soc. Heating, Refrigerating and Air-Conditioning Engineers, N.Y.); vapor pressures of ammonia solutions are from Wilson (Wilson, T. A. 1925, Total and Partial Vapor Pressures of Aqueous Ammonia Solutions, Univ. of Ill. Eng. Exp. Sta. Bull, 146); enthalpies of ammonia solutions are from Scatchard et al tables (Scatchard, George, L. F. Epstein, James Warburton, Jr. and P. J. Cody, 1947, Thermodynamic properties—saturated liquid and vapor of ammonia-water mixtures, Refrigeration Engineering 53:413–419), normalized to ASHRAE tables by adding 77.9 btu/lb multiplied by the weight fraction of ammonia in the solution.

TABLE 2

100 MWe 2 STAGE-TIS TEC PLANT PERFORMANCE CHARACTERISTICS

| Line | t °F. | p pisa | wt % $NH_3$ | h btu/lb | w K lb/sec | w-h |
|---|---|---|---|---|---|---|
| 1 | 70.0 | 128.8 | 99.99 | 629.1 | 1.126 | 708.3 |
|   | 96.6 | *127.8 | 99.99 | 647.9 | 1.126 | 729.5 |
| 2 | 70.1 | 133.8 | 0.01 | 38.1 | 1.322 | 50.4 |
|   | 96.6 | 132.8 | 0.01 | 64.6 | 1.322 | 85.4 |
| 3 | 134.0 | 130.8 | 46.00 | 40.4 | 2.449 | 98.9 |
|   | 85.0 | 129.8 | 46.00 | −15.2 | 2.449 | −37.2 |
| 4 | 70.0 | 128.8 | 0.01 | 38.1 | 1.322 | 50.4 |
| 5 |   | 128.8 | Hydrogen |   |   |   |
| 11 | 119.0 | 282.3 | 99.99 | 634.0 | 1.078 | 683.2 |
|   | 174.2 | 281.3 | 99.99 | 677.7 | 1.078 | 730.3 |
| 12 | 119.1 | 289.3 | 0.01 | 87.1 | 1.265 | 110.2 |
|   | 174.2 | 288.3 | 0.01 | 142.2 | 1.265 | 179.9 |
| 13 | 189.2 | 284.3 | 46.00 | 108.6 | 2.343 | 254.4 |
|   | 134.0 | 283.3 | 46.00 | 40.4 | 2.343 | 94.6 |
| 14 | 119.0 | 282.3 | 0.01 | 87.0 | 1.265 | 110.1 |
| 15 |   |   | Hydrogen |   |   |   |
| 21 | 50.58 | 90.19 | 100 | 625.07 | 1.103 | 689.5 |
| 22 | 50.00 | 89.19 | 100 | 97.9 | 1.103 | 108.0 |
| 23 | 53.00 | 593.0 | 100 | 101.3 | 1.103 | 111.7 |
|   | 87.18 | 590.5 | 100 | 140.25 | 1.103 | 154.7 |
| 24 | 295.0 | 587.78 | 100 | 733.20 | 1.103 | 808.7 |
| (C) in | 43.13 |   | 0 | 11.18 | 253.5 | 3009 |
| (C) out | 45.82 |   | 0 | 13.88 | 253.5 | 3736 |
| (W) in | 78.26 |   | 0 | 46.32 | 380.7 | 17729 |
| (W) out | 76.15 |   | 0 | 44.21 | 380.7 | 16922 |

*Where two sets of figures are given for a line, the top set represents values on entrance and the lower set represents values after heat transfers from line 3 to lines 1 and 2 or from line 13 to lines 11, 12 and 23.
°Partial pressure of hydrogen is not included.

With turbine efficiency of 0.900, generator efficiency 0.955: Gross power=108.8 MWe; net power=100 MWe.

TABLE 3

COMPARISON OF RANKINE CYCLE 100 MWe TEC PLANT OPERATING CHARACTERISTICS

| Parameter | 100 MWE Plant | | |
|---|---|---|---|
|   | Conventional Rankine | One-stage TIS-Rankine | Two-stage TIS-Rankine |
| Gross power, MWe | 115.45 | 108.61 | 108.80 |
| Warm water: °F. in | 78.26 | 78.26 | 78.26 |
| °F. out | 76.15 | 76.15 | 76.15 |
| KLB/sec flow | 1601 | 545.5 | 382.8 |
| Cold water: °F. in | 43.13 | 43.13 | 43.13 |
| °F. out | 45.82 | 45.82 | 45.82 |
| KLB/sec flow | 1209 | 381.9 | 269.2 |
| $NH_3$-Power cycle: KLB/sec | 6.36 | 1.914 | 1.103 |
| Gas into turbine: °F. | 70.00 | 188.00 | 295.0 |
| pisa | 128.8 | 280.0 | 587.8 |
| Fluid out of turbine °F. | 50.56 | 50.85 | 50.58 |
| pisa | 90.15 | 90.19 | 90.19 |
| Fraction gas - X | 0.973 | 1.000 | 0.9994 |
| Power - parasitic: $NH_3$ feed, MWe | 2.50 | 3.75 | 5.48 |
| Cold water pumps, MWe | 7.15 | 2.26 | 1.56 |
| Warm water pumps, MWe | 5.64 | 1.92 | 1.40 |
| Miscellaneous, MWe | 0.16 | 0.68 | 0.36 |
| Thermal cycle efficiency | 0.034 | 0.103 | 0.148 |

Having thus described our invention we claim:

1. In a closed Rankine cycle system for thermal energy conversion to mechanical energy and which is in communication with a body of water having differing water temperatures in spaced portions or with two bodies of water having differing water temperatures the improvement comprising the inclusion of temperature increasing means for increasing the temperature of the heat as supplied to the mechanical energy generator including means for accumulating the heat for an endothermic chemical reaction from a portion of the higher temperature water and means for releasing the heat in the reverse exothermic chemical reaction to increase the temperature of the products of said reaction above that of the higher temperature water, there being means to heat the working fluid of the Rankine cycle system from said products thereby permitting higher temperatures to be imparted to the working fluid, there being means for a partial separation of reactants from products of the endothermic chemical reaction providing one or more fractions with a concentration of reactants significantly greater than the equilibrium concentration of reactants thereby enabling the chemical reaction to proceed with absorption of heat, and there being means for providing one or more fractions with concentrations of products of the endothermic reaction greater than the equilibrium concentration of products thereby enabling the reverse chemical reaction to proceed with release of heat.

2. The means as claimed in claim 1 in which the temperature increasing means comprises means for decomposing ammonium hydroxide into ammonia and water and means for thereafter recombining the ammonia and water in a heat exchanger means for releasing heat at a higher temperature.

3. The means as claimed in claim 2 which has a thermal cycle efficiency substantially greater than 0.03.

4. The means as claimed in claim 1 which further comprises electric generating means operatively coupled to said mechanical energy.

5. The means as claimed in claim 1 which has a thermal cycle efficiency substantially greater than 0.03.

6. The means as claimed in claim 1 in which said body or bodies of waters comprise ocean waters.

7. The means as claimed in claim 1 in which said body or bodies of waters comprise a solar heated body of water.

8. The means as claimed in claim 1 in which said body or bodies of waters comprise man made bodies of water.

9. The means as claimed in claim 1 in which the water temperature differences result from solar radiation.

10. The means as claimed in claim 1 in which the water temperature differences result from the exposure of a portion of the waters to sources of waste heat.

11. The method as claimed in claim 1 in which ammonium hydroxide is decomposed and recombined.

12. The method as claimed in claim 1 in which said temperature increasing step comprises a two stage decomposition and recombination of a compound.

13. The method as claimed in claim 12 in which the two stage decomposition and recombination is of ammonium hydroxide.

14. The means as claimed in claim 1 which further comprises a two stage heat accumulating and heat release means.

15. The means as claimed in claim 14 which has a thermal cycle efficiency substantially greater than 0.148.

16. The means as claimed in claim 14 in which said temperature increasing means comprises means for decomposing and recombining ammonium hydroxide.

17. The means as claimed in claim 16 which has a thermal cycle efficiency substantially greater than 0.148.

18. In the method of utilizing one or more bodies of water having portions of differing temperatures to generate mechanical energy using a Rankine cycle the improvement comprising an additional step of increasing the temperature of the heat utilized to energize the mechanical energy generator including the steps of increasing the heat content of the working fluid of the Rankine cycle by accumulating heat in an endothermic chemical reaction from one portion of the high temperature water and releasing the heat at a higher temperature in the reverse exothermic chemical reaction to heat the working fluid and thereby increase its temperature, there being a partial separation of reactants from products of the endothermic chemical reaction providing one or more fractions with a concentration of reactants significantly greater than the equilibrium concentration of reactants thereby enabling the endothermic reaction to proceed and there being one or more fractions with a concentration of products of the endothermic reaction significantly greater than the equilibrium concentration of products thereby enabling the exothermic chemical reaction to proceed with a release of heat.

19. The method as claimed in claim 18 in which the waters of differing temperature gradients are ocean water.

20. The method as claimed in claim 18 in which the portions of differing temperature gradients are solar pond water.

21. The method as claimed in claim 18 in which the portions of differing temperature gradients includes portions exposed to waste heat.

22. The method as claimed in claim 18 in which the portions of differing temperatures includes portions exposed to solar radiation.

* * * * *